Dec. 6, 1949  W. H. KLIEVER  2,490,735
CONTROL APPARATUS
Filed May 31, 1943  4 Sheets-Sheet 1

Inventor
WALDO H. KLIEVER
George H Fisher
Attorney

Dec. 6, 1949 W. H. KLIEVER 2,490,735
CONTROL APPARATUS
Filed May 31, 1943 4 Sheets-Sheet 2

Inventor
WALDO H. KLIEVER
By George H Fisher
Attorney

Patented Dec. 6, 1949

2,490,735

UNITED STATES PATENT OFFICE 2,490,735

CONTROL APPARATUS

Waldo H. Kliever, Minneapolis, Minn., assignor to Minneapolis-Honeywell Regulator Company, Minneapolis, Minn., a corporation of Delaware Application May 31, 1943, Serial No. 489,175

16 Claims. (Cl. 33—222)

This invention relates to control apparatus and more particularly to devices in which the position of a continuously rotatable member is made effective at a distance to actuate an indicator or to operate any device which it is desired to make responsive to the angular position of the rotatable member. Since the invention is particularly adapted for use as a remotely indicating means with a magnetic compass, my preferred embodiment of the invention discloses it in association with such a compass, but it will be readily understood that the invention is adapted to be associated with any rotating member which it may be desired to use as a controller.

Devices for broadly making effective at a distance changes in the position for example of a compass needle are known, but these devices are subject to various difficulties as will hereinafter be pointed out. A particular disability from which previous compass devices have suffered lies in the fact that they have all required mechanical means near the compass needle itself, such for instance as an electric motor, for restoring the relationship between the compass needle and the indicator or actuator after unbalance due to movement of the needle has thrown the mechanism into operation. It is a further object of this invention to overcome this disability in prior art devices.

An object of this invention is to provide a new and improved remotely indicating or controlling apparatus.

A further object of this invention is to provide an improved remotely indicating or operating compass.

Another object of this invention is to provide an improved electrical system for continuously transmitting the angular position of a continuously rotatable member, without placing any appreciable load on the rotatable member.

Still another object of this invention is to provide an improved remotely indicating or operating compass which is continuously responsive to the angular position of the controlling compass member.

A still further object of this invention is to provide an improved electrostatic device having a plurality of fixed members and having further rotatable means adapted to cooperate with the fixed members to form a number of electrical condensers.

Still another object of my invention is to provide a device for torque amplification, whereby a minute signal torque produces an enormously larger response torque acting through an angle having any desired relation to the angle through which the signal torque acts.

Other objects and advantages of the present invention will become apparent from a study of the specification, claims, and appended drawings, wherein:

Figure 1:
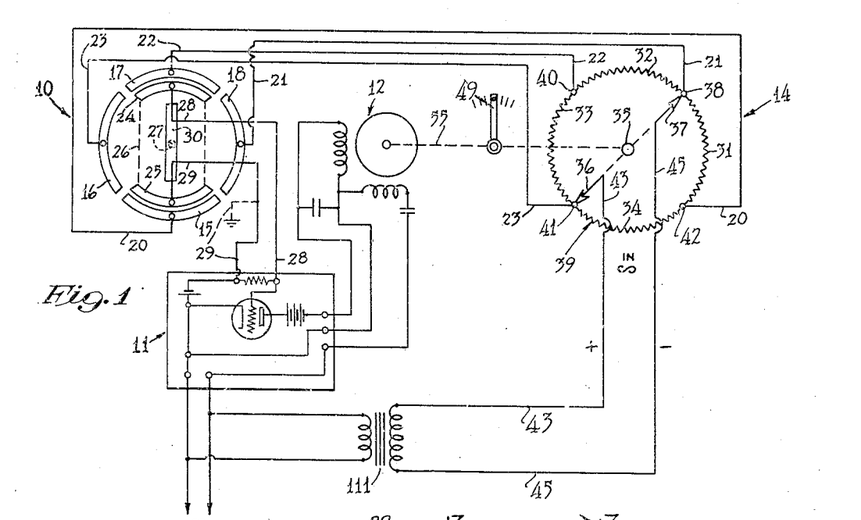
Figure 1 is a diagrammatic showing of an electrical circuit including a first embodiment of my invention shown in more detail in Figures 6 and 7.

Referring now to Figure 1 in which my complete invention is most clearly illustrated, it will be seen that the invention is made up of four principal parts of which numeral 10 refers to an electrostatic pickup device, numeral 11 to an amplifier and motor control unit, numeral 12 to a motor, and numeral 14 to a potential dividing device. An embodiment of the pickup and potential divider of this system is disclosed in Figures 6 and 7.

The electrostatic device 10 comprises a set of plates 15, 16, 17 and 18 which are shown as spaced portions of a cylinder. These plates are provided with electrical connections 20, 23, 22, and 21 respectively, for purposes to be disclosed presently. Concentric with the plates above mentioned, are shown another pair of plates 24 and 25 electrically insulated and supported by a member 26 in such fashion as to pivot around the axis 27 of the cylinder. Plates 24 and 25 are provided with conductors 28 and 29, respectively, which are connected to the input terminals of the amplifier and motor control unit 11 as shown in the figure. Member 26 also carries a magnetic needle 30 for responding to the horizontal component of the earth's magnetic field. The plates 15, 16, 17, 18, 24, and 25 cooperate to form a plurality of condensers connected in a capacitance network.

Turning now to the potential dividing device 14, it will be seen that this device may be composed of a toric coil 39 of resistance wire comprising four sections or resistors 31, 32, 33 and 34, corresponding generally with the plates 15, 16, 17 and 18 of the electrostatic member 10 and connected together sequentially in end to end relation to comprise a single closed electric circuit. A pair of contactor elements 36 and 37 are arranged for rotation about an axis 35 in such fashion that they are continually in conductive contact with the toric coil 14. Spaced around the coil will be seen connector elements 38, 40, 41 and 42 to which are connected conductors 21, 22, 23 and 20, respectively. Resistors 31, 32, 33, and 34 and contact elements 36 and 37 cooperate to comprise a resistance network. Contactor elements 36 and 37 are connected as by conductors 43 and 45 with a source of alternating current, which may be the secondary winding of a transformer 111.

From a consideration of the drawing, it will be seen that the potentials with respect to ground upon the various plates 15, 16, 17, and 18 of the electrostatic device will be determined by the position of the contactor elements 36 and 37 on the resistance coil 39. Thus, supposing the instantaneous polarity of the alternating current to be as shown, conductor 43 being positive and conductor 45 being negative, it will be seen that plate 16 is most positively charged and that plate 18 is most negatively charged while the charges of plates 15 and 17 are at some intermediate values. It will be seen that the angular dimensions of the fixed plates of the electrostatic device and of the coil portions comprising the toric coil may be related, so that rotation of the respective rotatable portions of these two devices through equal angles brings about equal and opposite changes in the voltage across conductors 28 and 29. Accordingly, in the position as shown in the figure the potentials on plates 15 and 17 are equal and no signal will be impressed on the input of the amplifier. As will be more fully pointed out below, for any position of member 26 there is a position of contacts 36 and 37 such that no signal is transmitted to the amplifier. I will refer to any such simultaneous arrangement of the movable members as a "balance" or "zero" position of the system.

Let the plates 24 and 25 have been rotated in a counter-clockwise direction by the action of the compass needle or some other controlling member, the instantaneous potentials with respect to ground on plates 15, 16, 17 and 18 again being those illustrated. The potential induced upon plate 24 is no longer simply that due to plate 17, but now includes a component due to positively charged plate 16, and the potential induced upon plate 25 includes a component due to negatively charged plate 18. Thus if the instantaneous potential difference between contactors 36 and 37 is 12 volts, of the indicated polarity, and if the angle through which plates 24 and 25 have been rotated is 45°, a positive potential of 3 volts will be induced on plate 25 and a negative potential of 3 volts will be induced on plate 24, both potentials being measured from the center tap 110 of the transformer. As the cycle continues, the potentials on conductors 43 and 45 vary, as do those on plates 16 and 18, and hence the induced potentials on plates 24 and 25. However, it will be observed for any given angular setting of the rotatable plates, that they attain their maximum potentials at the same instant in the cycle as do the fixed plates.

Now let the plates 24 and 25 have been rotated in a clockwise direction, the instantaneous potentials on plates 15, 16, 17, and 18 still being those illustrated. The potential induced upon plate 25 now includes a component due to negatively charged plate 18, and the potential induced upon plate 25 includes a component due to positively charged plate 16. Thus if the instantaneous potential difference between contactors 36 and 37 is 12 volts, of the indicated polarity, and if the angle through which plates 24 and 25 have been rotated is 45°, a negative potential of 3 volts will be induced on plate 25 and a positive potential of 3 volts will be induced on plate 24, both potentials again being measured from the center tap 110 of the transformer. As the cycle continues, the potentials on conductors 43 and 45 vary, as do those on plates 16 and 18 and hence the induced potentials on plates 24 and 25. It will again be observed that for any given angular turning of the rotatable plate they attain their maximum potentials, although this time of the opposite polarity, at the same instant in the cycle as before.

It will now be obvious that movement of plates 24 and 25 out of the balanced position causes potentials to be induced on the plates, the magnitude increasing with the size of the angle, and the polarity depending upon the direction of rotation. A reversal of polarity in alternating current circuits is a phase shift of 180°. Therefore, we may have impressed on the input of the amplifier either no signal or a signal of variable intensity which may be either in phase with or 180° out of phase with the inducing potential.

The amplifier and motor control unit to which I have previously referred may be of any suitable type. The construction and operation of one such amplifier are clearly set forth for example, in the copending application of Albert P. Upton, Serial No. 437,561, filed April 3, 1942, Pat. No. 2,423,534 and assigned to the assignee of the present application. For the sake of clarity I have illustrated the most simplified form of a conventional amplifier and motor control circuit such as is well known to those skilled in the art. Thus it will be apparent that one winding of the field of motor 12 is continuously energized through a capacitor from the source of alternating current, while the other field winding is energized from the output of electrostatic device 10, amplified in a conventional fashion in the triode tube. As previously pointed out, the output of device 10 is either in phase with the source or 180 degrees out of phase with it, and hence the current in the amplifier energized winding of the motor field leads or lags the current in the line energized winding by 90 degrees. Forward or reverse operation of the motor then occurs as the former current lags or leads the latter. In the absence of signal current, no operation of motor 12 takes place.

The shaft 55 of motor 12 carries an operating member 49, which may be an indicator or a controlling member associated for example with a rudder bar or a gyroscope.

I will now describe the operation of my invention. It will be understood that in setting up the invention the control device, an indicator needle located on a dial graduated in the points of a compass for illustration, has been adjusted to a predetermined position when the controlling element 26 is in a desired position with respect to fixed plates 15 to 18, and no potential difference exists between conductors 28 and 29.

If now for any reason element 26 rotates in either direction around its axis, plates 24 and 25 receive induced charges of a polarity and magnitude dependent on the size and extent of the angle of rotation, and the induced charges acting through the amplifier and motor control unit operate the motor accordingly in forward or reverse direction at a greater or lesser speed. The action of the motor has been so arranged that on the signal due to the disturbance of the balance in either direction the motor operates to move contactors 36 and 37 so as to compensate for the change in position of the plate by a suitable change in the impressed voltages. If the rotating plate moves in a counterclockwise direction, the contactors are rotated to decrease the positive potential on plate 16 and the negative potential on plate 18, and to create a negative potential on plate 17 and a positive potential on plate 15. This motion continues until the charge inducing potentials on the fixed plates are such, considered with the relative areas of plates 25 and 26, respectively, opposing each fixed plate, that the resulting induced potentials on plates 24 and 25 are equal. When this condition is reached, no potentials are impressed on the input of the amplifier and operation of the motor is then interrupted. If suitable gear ratios and graduation values have been selected, the indicator 49 is now again in agreement with the position of element 26. From a consideration of the above statement, it will be obvious that I have devised an electrostatic means for continuously transmitting the position of a continuously rotatable member.

Figure 2:
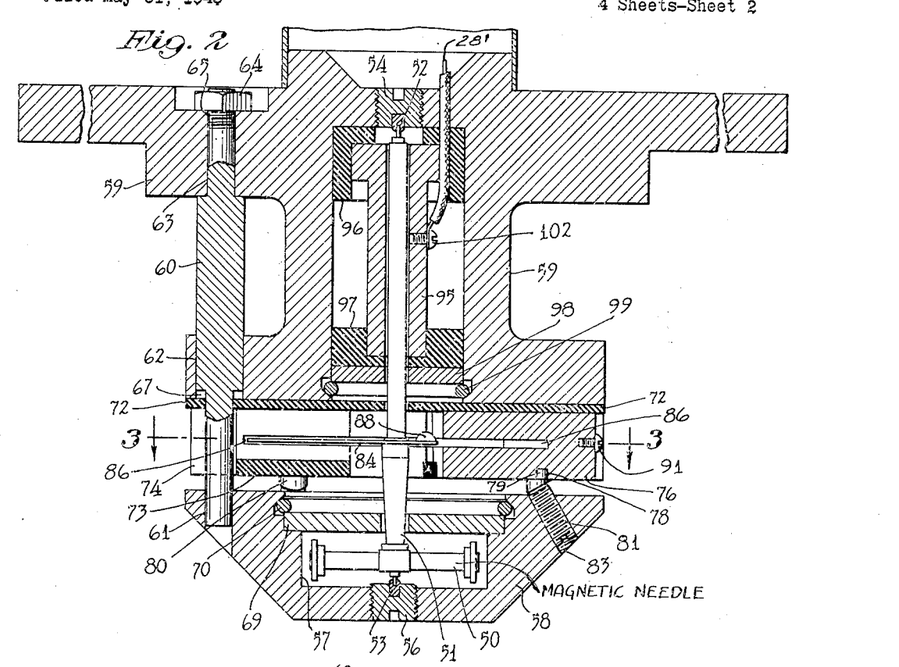
Figure 2 is a longitudinal sectional view of a second embodiment of a portion of my invention, the section being taken along the line 2—2 of Figure 3.

Referring now to Figure 2, there will be found a preferred embodiment 10' of the electrostatic device of my invention as specifically applied to the art of remote indicating compasses. A representation of a system analogous to that of Figure 1 but slightly adapted for use with the preferred form of my invention is found in Figure 8. In Figure 2 a magnetic needle 50 is unitarily mounted on a shaft 51 for rotation therewith in upper and lower bearings 52 and 53, respectively, carried respectively by upper and lower adjusting screws 54 and 56. Needle 50 is contained in a recess 57 in a magnetically transparent cap member 58. The cap member is fastened to a housing 59 by rods 60 sweated into the cap as at 61, passing through aligning holes 62 and further holes 63 in the housing, and fastened by nuts 64 threadedly engaging threaded portions 65 of the rods. The shaft 51 and the rods 60 have the same thermal coefficient of linear expansion, in order that changes in ambient temperature may not cause the shaft 51 either to become loose or to bind in its bearings, and it will be observed that spaces 67 are provided to allow for the relative movement of rods 60 and housing 59.

A electrically conducting disk 69 is held in position above the magnetic needle 50 by a snap ring 70, whereby to electrostatically shield the needle from portions of the device above the disk.

Separated from the housing 59 by an insulating layer 72 are a plurality of brass blocks 74, 75, 76 and 77 in the form of sectors of an annulus of U-shaped cross-section. Insulating members 73 are provided to separate the blocks from one another, and the blocks are provided with shallow holes 78 adapted to receive the pins 79 of Bakelite insulating elements 80. The ends of these elements are cut off at an angle whereby they may cooperate with set screws 81 mounted in angularly tapped holes 83 in cap member 58, to hold the brass sections firmly in place.

Unitarily mounted on the shaft 51 for rotation therewith is a thin vane 84 of electrically conducting material in the form of a circular sector whose center coincides with the axis of rotation of shaft 51. This vane moves in a circular recess formed in the brass blocks by cutting therein grooves 86. Thus the vane and the brass blocks may cooperate, depending upon the relative positions of the vane and the blocks, to form a number of electrical condensers. A counterweight 88 is provided to balance the moment couple of the vane 84 at the ends of the shaft. The brass blocks are provided with connecting screws 89, 90, 91, and 92 whereby electrical connections may be made with them.

Spacedly surrounding shaft 51 above the insulating member 72 is an electrically conducting sleeve 95 supported between insulating collars 96 and 97 by an aluminum disk 98 held in place by a snap ring 99. Sleeve 95 and shaft 51 comprise the two conductors of a coaxial condenser and the air in the space between them comprises the dielectric of the condenser. Electrical connection is made between amplifier 11 and the coaxial condenser by means of conductor 28', which terminates at a conecting screw 102 in sleeve 95. The coaxial condenser is thus connected in series between the electrostatic pickup device and the amplifier, and conducts the alternating current signal output of the pickup, presenting thereto an impedance determined by its dimensions just as would any conventionally constructed condenser.

Figure 4:
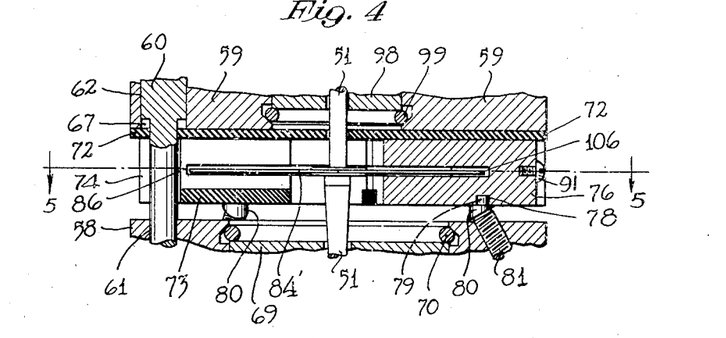
Figure 4 is a fragmentary view similar to Figure 2 but showing a modification of the second embodiment of my invention.
Figure 5:
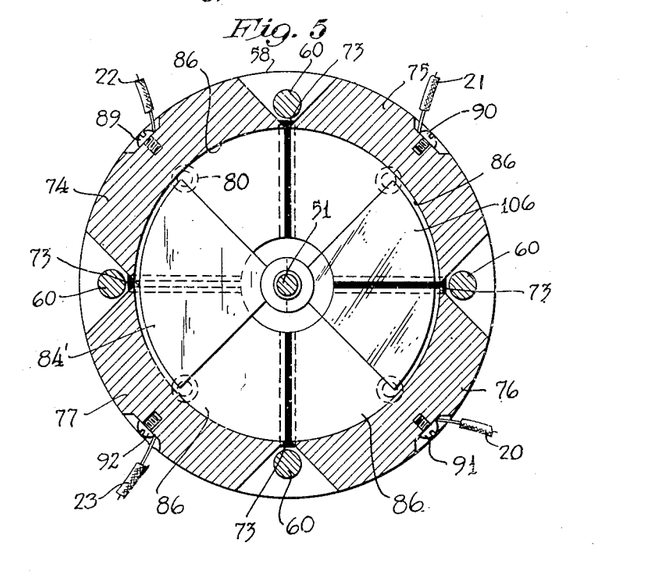
Figure 5 is a transverse sectional view similar to Figure 3, but taken along the line 5—5 of Figure 4.

The modification of the device as disclosed in Figure 4 differs from that in Figure 2 only in the fact that counterweight 88 has been replaced by a mica vane counterweight 106, in diametrically opposed relation to vane 84 and travelling in the same circular recess in the brass blocks.

Figure 3:
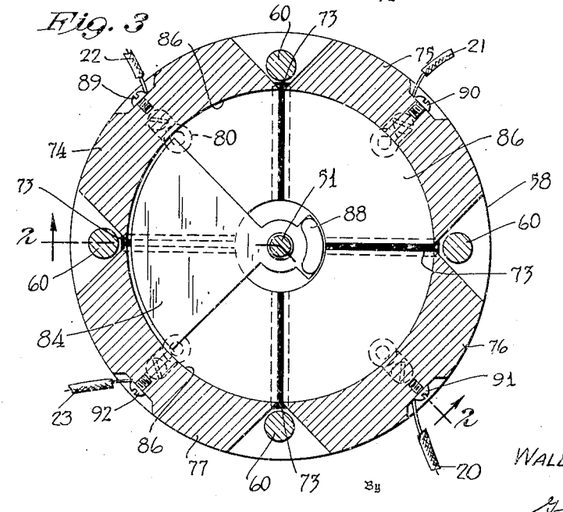
Figure 3 is a transverse sectional view of the same device, the section being taken in a plane indicated by the line 3—3 of Figure 2.

In the embodiments of the invention shown in Figures 2 and 3 it is obvious that a single rotatable plate has been used instead of a pair of rotatable plates shown in Figure 1, and I conceive the spirit of my invention to be broad enough to include this modification. This is illustrated in Figure 8, where I have redrawn Figure 1 to substitute for conductor 29 and plate 25 a connection 29' which grounds one pole of the input of the amplifier, and to show the provision of a grounded center tap 110 in the secondary winding of the transformer 111 providing current to potential divider 14.

Figure 8:
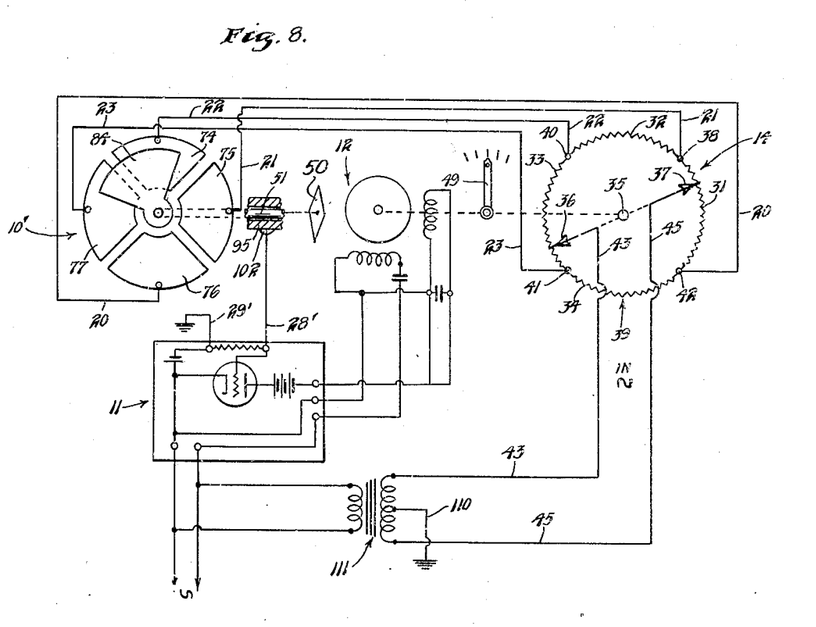
Figure 8 is a diagrammatic showing similar to Figure 1, but including the embodiment of my invention shown in detail in Figures 2, 3, 4, and 5, and showing the system in an electrically unbalanced state.

The operation of this device, in a system as illustrated in Figure 8, does not differ materially from that which I have previously described. It will at once be apparent that the potentials on the various brass blocks differ from the ground potential as the position of contactors 36 and 37 varies. The single vane receives induced potentials with respect to the ground proportional to the relative areas thereof opposed to the blocks, and to the potentials on the blocks, in a manner similar to that already described with reference to Figure 1. The alternating induced voltage is transmitted through the coaxial condenser and energizes amplifier 11 to actuate motor 12. This results, under conditions as shown in Figure 8, in rotation of contactors 36 and 37 in a counter-clockwise direction through approximately 45 degrees, when the potentials in plates 74 and 77 acquire such magnitudes that no voltage is induced between plate 84 and ground, and motor operation is interrupted.

Figure 6:
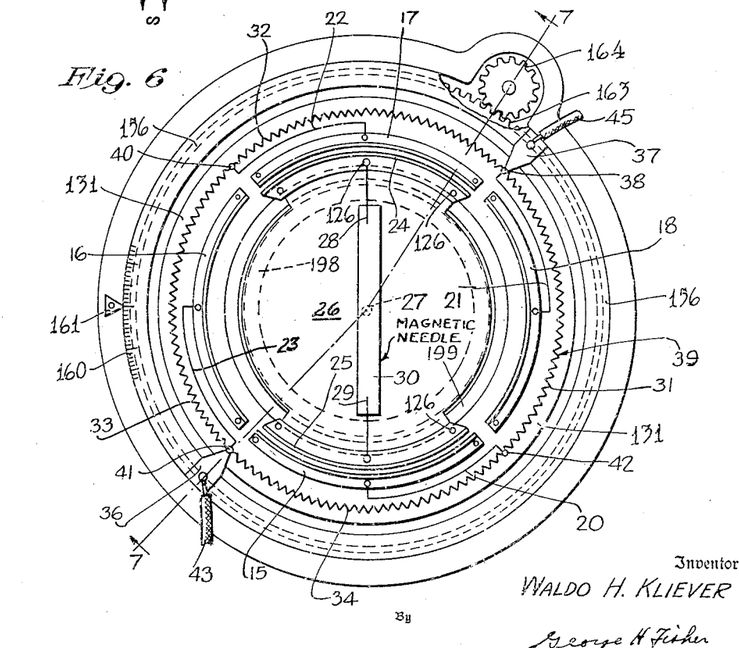
Figure 6 is a diagrammatic showing of the first embodiment of the invention not taking full advantage of all the potentialities of my invention and yet having a number of features of convenience.
Figure 7:
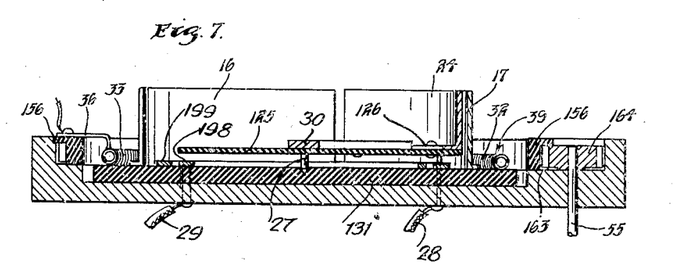
Figure 7 is a longitudinal sectional view of the embodiment of my invention shown in Figure 6, the section being taken along the line 7—7 in Figure 6.

In Figure 6, I have illustrated a modification of my invention combining the electrostatic device and the potential divider device in one instrument, and embodying the system illustrated in Figure 1. I consider this modification less preferred since it fails to take advantage of the full potentialities of my invention, but it nevertheless has certain advantages of compactness and convenience, particularly where the device is controlled by some device other than a magnetic compass. In Figure 6, a disk 26 is arranged for rotation with the shaft or other object whose angular position is to be indicated or otherwise utilized. Unitarily attached to this disk as by rivets 126 are a pair of plates 24 and 25 in the form of portions of a cylinder. Fastened in a similar fashion to a fixed disk 131 of insulating material are four other plates 18, 15, 16, and 17 shaped to comprise portions of a cylinder slightly larger in radius than that of plates 24 and 25. A pair of slip rings 198 and 199 may be carried by disc 131 for engagement by suitable sliders connected to plates 24 and 25: one of these sliders appears in Figure 7. Conductors 28 and 29 are connected to slip rings 199 and 198 for making electrical connection with plates 24 and 25, all respectively, and amplifier 11.

Also mounted in any convenient fashion on the member 131 is an endless coil 39 of resistance wire in the form of a torus. This coil is divided circumferentially into four portions 32, 33, 34, and 31. The points of junction of these portions of coil 136 are connected by conductors, 22, 21, 20, and 23 with the fixed plates previously mentioned. An annular ring 156 also of electrically insulating material, is rotatable about the toric coil and carries contacting elements 37 and 36 which continually make electrical contact with the coil. These contacting elements are designed to be connected to a source of alternating current and communicate this current to the coil. The outer edge of annulus 156 may be graduated as shown at 160 and an index 161 may be located on some portion of the frame of the device. Any conventional mechanical means may be provided for causing 156 to rotate with respect to 131 and 161. For the sake of illustration only, I have shown element 156 as being provided with a series of gear teeth 163 with which is adapted to engage a gear 164, to be driven by shaft 55. This is no more than a mechanical equivalent of the direct connection shown in Figure 1 between shaft 55 of motor 12 and contactors 36 and 37, which in that figure are the equivalent of contactors 37 and 36 in Figure 6.

The operation of this embodiment of the device is that set forth with reference to Figure 1. Deviation of the compass needle from its zero position causes differential interleaving of the conducting plates in the fixed plates, impressing a potential on the amplifier which may lead or lag the primary potential, and accordingly the motor runs in one direction or the other, altering the potential upon the fixed plates until this signal disappears from the amplifier. Graduations 160 rotate past index 161 at the same time that contacts 37 and 36 rotate about the coil, so that upon cessation of signal the indication of index 161 is the same as the actual position of the rotary member.

I have explained the operation of my invention in the terminology of electrostatics. An alternative explanation in electro-dynamic terminology follows, reference first being had to Figure 1: the structure of my invention is the same, of course, whichever explanation is preferred.

A number of paths can be followed by the alternating current supplied by transformer 111 from conductor 43 to conductor 45: of these paths, only two are of significance as affecting the operation of motor 12. The first significant path can be traced as follows: conductor 43, contactor 36, connection 41, conductor 23, plates 16 and 18, conductor 21, connection 38, contactor 37, and conductor 45. The second significant path can be traced as follows: conductor 43, contactor 36, resistance section 33, connection 40, conductor 22, plates 17 and 15, conductor 20, connection 42, resistance section 31, contactor 37, and conductor 45.

In the positions of the potential divider and the pickup member shown in Figure 1 connections 40 and 42 are at the same potential, and therefore no current flows in the second circuit just traced. Slight current may flow in the first circuit: however, due to the arrangement of member 26, no potential difference appears between plate 24 to plate 25, and this results in a zero output to amplifier 11.

If member 26 is rotated in a counter-clockwise direction, there is a predominant flow of current from plate 16 through plate 24, conductor 28, amplifier 11, conductor 29 and plate 25 to plate 20 during the indicated half cycle of the source, and in the opposite direction during the next half cycle: this results in the appearance of a signal voltage between conductors 28 and 29 which is of a fixed phase with respect to the source, and the motor is energized to rotate in a counter-clockwise direction. The voltage between plates 16 and 18 is accordingly reduced, which reduces the signal voltage reaching the amplifier, and also an increasing potential difference appears between plates 17 and 15 of a nature tending to cause flow of current through plate 24, conductor 28, amplifier 11, conductor 29 and plate 15. The effect of this current in the opposite direction through amplifier 11 opposes that passing through plates 16 and 18. Operation of motor 12 continues until the signal voltage has completely disappeared from conductors 28 and 29, when the motor stops.

If member 26 rotates in a counter-clockwise direction, there is a predominant flow of current from plate 25 to plate 24 during the indicated half cycle of the source, and in the opposite direction during the next half cycle: this results in the appearance of a signal voltage between conductors 28 and 29 which is of a second phase with respect to the source—that is, of opposite phase to that resulting from counter-clockwise rotation of member 26—and the motor is energized to rotate in a clockwise direction. The voltage between plates 16 and 18 is again reduced, reducing the signal voltage reaching the amplifier, and an increasing potential difference again appears between plates 17 and 15, tending to cause flow of current through conductors 28 and 29 in the opposite direction to that due to plates 16 and 18. Operation of motor 12 continues until the signal voltage has completely disappeared from conductors 28 and 29, when the motor stops.

In Figure 1 my electrical system is shown in its normal or balanced condition. Figure 8, on the other hand, is prepared to show the preferred embodiment of my invention in an electrically unbalanced condition. In Figure 8 there are again a number of current paths, but only four are operatively significant, and of these not more than two are significant at any one time; in certain special cases only one path is significant. The significant paths are determined by the rotated position of vane 84 and include the block or blocks with which it is in apposition. In Figure 8 the significant paths are two in number. The first can be traced as follows: conductor 43, contactor 36, the upper portion of winding 33, connection 40, conductor 22, a condenser comprising plate 74 and the apposed portion of vane 84; shaft 51, the coaxial condenser, conductor 28', the input resistor of amplifier 11, and ground connections 29' and 110. The second path may be traced as follows: conductor 43, contactor 36, the lower portion of winding 33, connection 41, conductor 23, a condenser comprising plate 77 and the apposed portion of vane 84, shaft 51, the coaxial condenser, conductor 28, the input resistor of amplifier 11, and ground connections 29' and 110.

Current flows in each of the paths just traced and the voltage drop across the amplifier input resistor is determined by the sum of the two currents. The amplifier accordingly energizes the motor to rotate shaft 35 in a counter-clockwise direction moving contactors 36 and 37 around resistance 39 to vary the amount of resistance in series with each of the condensers comprising portions of vane 54 and thus to change the currents flowing through the condensers.

When the shaft 35 has rotated so that contactors 36 and 37 engage connections 41 and 38, respectively, connection 40 is at ground potential, since windings 33 and 32 are of equal resistance and ground connection 110 is connected to the center of the transformer secondary. Plate 74 is therefore at ground potential and no current flows through the amplifier input resistor from the circuit including plate 74. Connection 41, however, is at its maximum potential and a maximum current flows through the amplifier input resistor from the circuit including plate 77.

Further rotation of shaft 35 in the same direction reduces the flow of current in the circuit including plate 77. Moreover, a current now flows in the circuit including plate 74 of the opposite phase since connection 41 is now beyond the center of the resistance included between contactors 36 and 37. This latter current opposes the former current, and presently a position of shaft 35 is reached in which the system is in balance, the two currents completely neutralizing one another. This balance position is not that at which the potentials on plates 74 and 77, with respect to ground, are equal, because the impedances offered to the flow of current by the condensers including vane 84 are not equal, but have an inverse ratio to the apposed areas of vane 84.

The zero or balance point of the system, at which operation of motor 12 was interrupted, is therefore that at which equal and opposite currents tend to flow in the amplifier input resistor from the two circuits including vane 84. For any position of vane 84 there is only one position of contactors 36 and 37 in which the circuit is in a stable condition of balance.

From a consideration of the structure and operation of my invention it will now be obvious that the invention basically comprises a torque amplifier. The torque exerted on the needle by the earth's magnetic field, when the needle is displaced from the magnetic meridian by any practically occurring angle, is minute. Yet in one embodiment of my invention torque outputs of the order of 300,000,000 dyne-cm. have been observed. Thus an enormous torque amplification is possible.

In the modifications of my invention I have illustrated it is apparent that the angle through which the output torque acts is equal to the angle through which the input torque acts. However, those skilled in the art will immediately perceive that provision of suitable reduction means between motor 12 and shaft 55 will make possible any desired ratio between the two angles.

While I have shown and described certain preferred embodiments of my invention, further modifications will readily occur to those who are skilled in the art, and I therefore wish my invention to be limited only by the scope of the appended claims.

I claim:

1. In a control device, in combination, a fixed index, a first member of electrically insulating material, said member being continuously rotatable with respect to said index, graduations carried by said member adapted to cooperate with said index, radially disposed electrical contact elements unitarily mounted on said member for rotation therewith, a second member of electrically insulating material, said member being fixed with respect to said first member, a resistance coil carried by said second member, said resistance coil continuously contacting said contact elements, a plurality of circumferentially equidistant electrical connections to said resistance coil, a like plurality of circumferentially equidistant electrically conducting elements carried by said second member, said electrical connections leading to said elements, a third member of electrically insulating material, said third member being continuously rotatable, a pair of electrically conducting elements mounted on said third member for rotation therewith, said pair of elements cooperating with said plurality of elements to comprise electrical condensers, said elements being so arranged that each of said pair of elements may comprise a condenser with each of said plurality of elements, means continuously providing electrical connections with each of said pair of elements, a motor, means operatively connected to said last mentioned means for reversibly actuating said motor, means providing electrical energy to said contact elements on said first member, controlling means unitarily mounted on said third member and causing rotation thereof, and means connecting said motor in driving relation to said first mentioned members.

2. In a device of the class described, in combination: a source of electrical energy; a closed resistance network comprising a number of resistors greater than two; means variably connecting said source with said network, whereby spaced points on said network may acquire unitarily variable potentials with respect to a selected point; an adjustable capacitance network comprising a number of capacitors greater than two and having input terminals and an output circuit; means connecting said points on said resistance network with said input terminals of said capacitance network; a movable controlling member; means connecting said controlling member with said capacitance network for causing adjustment of said network; a motor; and means electrically connecting said motor, said source, and the output circuit of said capacitance network for energizing said motor from said source in accordance with the adjusted condition of said network corresponding to the position of said controlling member.

3. In a device of the class described, in combination: a source of electrical energy; a closed resistance network comprising a number of resistors greater than two; means variably connecting said source with said network, whereby spaced points on said network may acquire unitarily variable potentials with respect to a selected point; an adjustable capacitance network comprising a number of capacitors greater than two and having input terminals and an output circuit; means connecting said points on said resistance network with the input terminals of said capacitance network; a movable controlling member; means connecting said controlling member with said capacitance network for causing adjustment of said network; a motor; means electrically connecting said motor, said source, and the output circuit of said capacitance network for energization from said source in accordance with the adjusted condition of said network corresponding to the position of said controlling member; and means connecting said motor with said variable connecting means for unitarily varying said potentials of said points.

4. In a device of the class described, in combination: a source of electrical energy; a closed resistance network comprising a number of resistors greater than two; means variably connecting said source with said network, whereby spaced points on said network may acquire unitarily variable potentials with respect to a selected point; an adjustable capacitance network comprising a number of capacitors greater than two having input terminals and an output circuit; means connecting said points on said resistance network with the input terminals of said capacitance network; a controlling member movable in response to a condition; means connecting said controlling member with said capacitance network for causing adjustment of said network; a motor; means electrically connecting said motor, said source, and the output circuit of said capacitance network for energization from said source in accordance with the adjusted condition of said network corresponding to the position of said controlling member, means to be actuated in accordance with the value of said condition, and means connecting said last named means with said motor for actuation thereby.

5. In a device of the class described, in combination: a source of electrical energy; a resistance network; means variably connecting said source with said network, whereby spaced points on said network may acquire unitarily variable potentials with respect to a selected point; an adjustable capacitance network comprising a number of capacitors greater than two and having input terminals and an output circuit; means connecting said points on said resistance network with the input terminals of said capacitance network; a movable controlling member; means connecting said controlling member with said capacitance network for causing adjustment of said network; a motor; means electrically connecting said motor, said source, and the output circuit of said capacitance network for energizing said motor from said source in accordance with the adjusted condition of said network corresponding to the position of said controlling member; said resistance network comprising a number of resistors greater than two sequentially joined in end to end relation to form a closed electric circuit, each junction of two of said resistors comprising one of said spaced points, and spaced contact members unitarily slidable along said resistors for conducting electrical energy to said network in accordance with the position of said members.

6. In a device of the class described, in combination: a source of electrical energy; a closed resistance network comprising a number of resistors greater than two; means variably connecting said source with said network, whereby spaced points on said network may acquire unitarily variable potentials with respect to a selected point; an adjustable capacitance network having input terminals and an output circuit; means connecting said points on said resistance network with the input terminals of said capacitance network; a movable controlling member; means connecting said controlling member with said capacitance network for causing adjustment of said network; a motor; means electrically connecting said motor, said source, and the output circuit of said capacitance network for energizing said motor from said source in accordance with the adjusted condition of said network corresponding to the position of said controlling member: said capacitance network comprising three or more electrically conducting elements, an assembly including at least one further electrically conducting member, and means mounting said assembly for rotation, with respect to said plurality of elements, whereby said member may cooperate with the elements of said plurality to comprise a number of capacitors greater than two, the arrangement of said elements and said assembly being such that said member may comprise a condenser with any element or any two adjacent elements of said plurality.

7. In a device of the class described, in combination: a source of electrical energy; a resistance network comprising a number of resistors greater than two; means variably connecting said source with said network, whereby spaced points on said network may acquire unitarily variable potentials with respect to a selected point; an adjustable capacitance network having input terminals and an output circuit; means connecting said points on said resistance network with the input terminals of said capacitance network; a movable controlling member; means connecting said controlling member with said capacitance network for causing adjustment of said network; a motor; means electrically connecting said motor, said source, and the output circuit of said capacitance network for energizing said motor from said source in accordance with the adjusted condition of said network corresponding to the position of said controlling member: said capacitance network comprising a set of electrically conducting elements carried by said controlling member for rotation therewith, a further set of three or more electrically conducting elements, and means mounting a first of said sets for rotation with respect to the second of said sets so that each element of said first set may be aligned with the elements of said second set to comprise a number of capacitors greater than two, the arrangement of said elements being such that said relative rotation may cause each element of said first set to comprise a condenser with any element or any two adjacent elements of said second set.

8. In a device of the class described, in combination: a source of electrical energy; a resistance network; means variably connecting said source with said network, whereby spaced points on said network may acquire unitarily variable potentials with respect to a selected point; an adjustable capacitance network having input terminals and an output circuit; means connecting said points on said resistance network with the input terminals of said capacitance network; a movable controlling member; means connecting said controlling member with said capacitance network for causing adjustment of said network; a motor; means electrically connecting said motor, said source, and the output circuit of said capacitance network for energizing said motor from said source in accordance with the adjusted condition of said network corresponding to the position of said controlling member; said resistance network comprising a number of resistors greater than two sequentially joined in end to end relation to form a closed electric circuit, each junction of two of said resistors comprising one of said spaced points, and spaced contact members unitarily slidable along said resistors for conducting electrical energy to said network in accordance with the position of said members; said capacitance network comprising a plurality of electrically conducting elements, an assembly including at least one electrically conducting member, and means mounting said assembly for rotation, with respect to said plurality of elements, whereby said member may cooperate with the elements of said plurality to comprise a number of capacitors greater than two, the arrangement of said elements and said assembly being such that said member may comprise a condenser with any element or any two adjacent elements of said plurality.

9. A remotely indicating compass comprising, in combination: a source of electrical energy; an endless resistance network; means variably connecting said source with said network, whereby spaced points on said network may acquire unitarily variable potentials with respect to a selected point; an adjustable capacitance network having input and output terminals; means connecting said points on said resistance network with the input terminals of said capacitance network to comprise a telemetric system which can be balanced for any variation of connections between said source and said network established by said first named means; a magnetic needle, means mounting said needle for unlimited rotation; means mechanically connecting said needle with said capacitance network for causing adjustment of said network; a motor; means connecting said motor with said source and with the output terminals of said capacitance network for energization from said source in accordance with the adjusted condition of said network corresponding to the position of said needle; an indicator of azimuth, means connecting said motor with said indicator for actuation thereof, and further means connecting said motor with said variable connecting means for causing unitary variation of said potentials of said points simultaneous with said actuation of said indicator.

10. In a device of the class described, in combination: a plurality of resistors in the form of circular arcs connected together to comprise a closed circular resistance network; a like plurality of electrically conducting plates equally spaced about an axis; means connecting said plates, in sequence, to points of connection of said resistors, also in sequence; a pair of contact elements; means pivotally mounting said contact elements for rotative sliding upon said circular network in diametrically opposed relation; a pair of further conducting plates; means pivotally mounting said further plates for unrestricted rotation about said axis and for cooperation with said first named plates to comprise a capacitance network; means connected to said contact elements for energization thereof with alternating voltage; and means connected to said further plates for responding to potential differences therebetween.

11. In a device of the class described, in combination: a plurality of resistors in the form of circular arcs connected together to comprise a closed circular resistance network; a like plurality of electrically conducting plates equally spaced around an axis; means connecting said plates, in sequence, to points of connection of said resistors, also in sequence; a pair of contact elements; means pivotally mounting said contact elements for rotative sliding upon said circular network in diametrically spaced relation; a pair of further conducting plates; means pivotally mounting said further plates for unrestricted rotation about said axis and for cooperation with said first named means to comprise a capacitance network, magnetic means carried by said last named means for causing the same to rotate in response to the earth's magnetic field; an indicator; means connected to said contact elements for energization thereof with alternating voltage; and means connected to said further plates for rotating said contact elements and actuating said indicator in response to potential differences between said plates.

12. In a device of the class described, in combination: a plurality of resistors in the form of circular arcs, connected together to comprise a closed circular resistance network; a like plurality of slotted blocks of electrically conducting material; means mounting said blocks about an axis with their slots inwardly directed in coplanar relationship; means connecting said blocks, in sequence, to points of connection of said resistors, also in sequence; a pair of contact elements; means pivotally mounting said contact elements for rotative sliding upon said circular network in diametrically opposed relation; a vane of electrically conducting material; means pivotally mounting said vane for rotation about said axis to traverse said slots and to cooperate with said first named blocks to comprise a capacitance network; means connected to said contact elements for impressing thereon alternating potentials of equal magnitude and of opposite phase with respect to a point of comparison, and means connected to said vane for responding to the potential difference between said vane and said point.

13. In a device of the class described, in combination: a plurality of resistors in the form of circular arcs, connected together to comprise a closed circular resistance network; a like plurality of slotted blocks of electrically conducting material; means mounting said blocks about an axis with their slots inwardly directed in coplanar relationship; means connecting said blocks, in sequence, to points of connection of said resistors, also in sequence; a pair of contact elements; means pivotally mounting said contact elements for rotative sliding upon said circular network in diametrically opposed relation; a vane of electrically conducting material; means pivotally mounting said vane for rotation about said axis to traverse said slots and for cooperation with said first named blocks to comprise a capacitance network; magnetic means, carried by said last named means, for causing the same to rotate in response to the earth's magnetic field; means connected to said contact elements for impressing thereon alternating potentials of equal magnitude and opposite phase with respect to a point of comparison; an indicator; and means connected to said vane and said point for rotating said contact elements and actuating said indicator in response to the potential difference between said vane and said point.

14. In telemetric apparatus, in combination: a motor to be controlled; sending and receiving impedance means for controlling said motor, each said impedance means comprising a plurality of stationary elements arranged in a circular configuration, two mutually insulated movable elements, and means mounting said movable elements for unitary rotation about an axis extending through said circular configuration, the elements of at least one of said impedance means being in the form of condenser plates and the movable elements thereof being spaced from the stationary elements by a substantially frictionfree dielectric; a source of alternating voltage of a selected frequency; means energizing the movable elements of said sending means from said source; means for independently rotating the movable elements of said sending and said receiving impedance means; means interconnecting stationary elements of said sending and receiving means, so that for each rotated position of said sending means there is a balance position of the movable elements of said receiving means in which they are both at the same potential, while in other positions there appears between them an alternating output voltage of the frequency of said source which varies in magnitude and reverses in phase with variation in the extent and reversal in the direction of their displacement with respect to the balance position; means energizing said motor, from said source and from the movable elements of said receiving means, for operation which reverses with reversal in the phase of said output voltage and which ceases when said output voltage is zero; means mechanically connecting said motor to drive said movable elements of said receiving impedance means in a direction to reduce said output voltage to zero and thus to rebalance the apparatus; and controlled means actuated by said motor.

15. In telemetric apparatus, in combination: a motor to be controlled; first and second impedance means for controlling said motor, each said means comprising a plurality of stationary elements arranged in a circular configuration, a member movable with respect to said stationary elements, and means for causing rotation of said movable member about an axis extending through said circular configuration, said movable member of one of said impedance means comprising a pair of operative elements and said movable member of the other of said impedance means comprising a single operative element; a source of alternating voltage of selected frequency having a center tap; means energizing one of said impedance means from said source through the elements of said movable member; means for independently rotating said movable members; means interconnecting corresponding stationary elements of said first and second impedance means so that for each rotated position of said single operative element there is a balance position of said pair of operative elements such that said single element is at the same potential as said center tap, while in other rotated positions of said pair of elements said single element assumes an alternating output voltage with respect to said center tap which varies in magnitude and reverses in phase with variation in the extent and reversal in the direction of the displacement of said pair of elements from said balanced position; means energizing said motor, from said source and from said output voltage, for operation which reverses with reversal in the phase of said output voltage and which ceases when said output voltage is zero; means mechanically connecting said motor to drive said movable member of said receiving impedance means in a direction to cause decrease in said output voltage and thus to rebalance the apparatus; and controlled means actuated by said motor.

16. In telemetric apparatus, in combination: a motor to be controlled; sending and receiving impedance means for controlling said motor, each said impedance means comprising a plurality of stationary elements arranged in a circular configuration, a movable member including at least one movable element, and means mounting said member for rotation about an axis extending through said circular configuration, the stationary elements of said sending means being in the form of condenser plates cooperating with means including said movable element to comprise a plurality of variable condensers, said last named movable element being spaced from said stationary condenser plates by a substantially frictionfree dielectric; a source of alternating voltage of a selected frequency; means variably energizing the stationary elements of said receiving means, as compared to a point of fixed potential, from said source; means for rotating the movable members of said sending and said receiving means; means interconnecting corresponding stationary elements of said sending and receiving means so that for each rotated position of the movable member of said sending means there is a balance position of the movable member of said receiving means in which said apparatus gives no output voltage, while in other rotated positions of said movable member of said receiving means the apparatus gives an alternating output voltage of the frequency of said source which varies in magnitude and reverses in phase with variation in the extent and reversal in the direction of displacement of said rotatable member from said balance position; means energizing said motor, from said source and from said output voltage, for operation which reverses with reversal in the phase of said output voltage and which ceases when said output voltage is zero; means mechanically connecting said motor to drive said movable member of said receiving means in a direction to cause decrease in said output voltage and thus to rebalance the apparatus; and controlled means actuated by said motor.

WALDO H. KLIEVER.

REFERENCES CITED

The following references are of record in the file of this patent:

UNITED STATES PATENTS

| Number | Name | Date |
|---|---|---|
| 1,396,030 | Dubilier | Nov. 8, 1921 |
| 1,683,090 | Mirick | Sept. 4, 1928 |
| 1,694,237 | Simonds | Dec. 4, 1928 |
| 1,820,647 | Brown | Aug. 25, 1931 |
| 1,970,442 | Wittkuhns et al | Aug. 14, 1934 |
| 2,059,271 | Parker | Nov. 3, 1936 |
| 2,089,987 | Urfer | Aug. 17, 1937 |
| 2,111,442 | West | Mar. 15, 1938 |
| 2,194,696 | Eickenmeyer | Mar. 26, 1940 |
| 2,210,494 | Moore | Aug. 6, 1940 |
| 2,277,027 | West | Mar. 24, 1942 |
| 2,290,875 | Grieback | July 28, 1942 |
| 2,305,878 | Krussman et al | Dec. 22, 1942 |
| 2,328,670 | Parker | Sept. 7, 1943 |